J. M. GIBBS.
ICE CREAM DIPPER.
APPLICATION FILED DEC. 5, 1921.
1,430,979.
Patented Oct. 3, 1922.
2 SHEETS—SHEET 1.
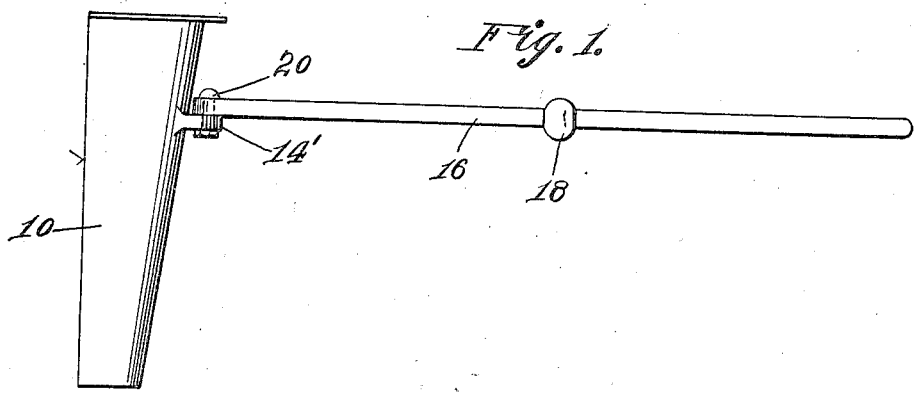
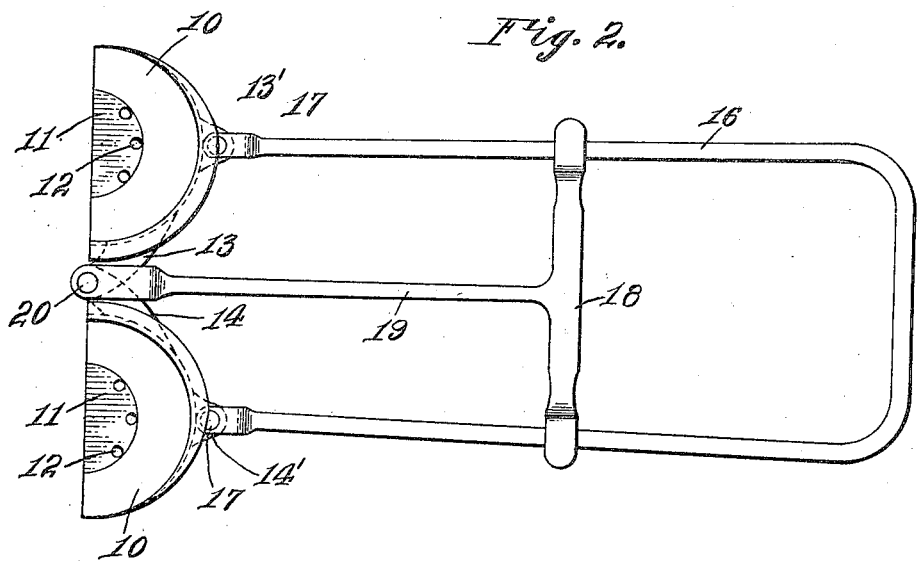
John M. Gibbs
INVENTOR
BY Victor J. Evans
ATTORNEY
WITNESS:

J. M. GIBBS.
ICE CREAM DIPPER.
APPLICATION FILED DEC. 5, 1921.
1,430,979.
Patented Oct. 3, 1922.
2 SHEETS—SHEET 2.
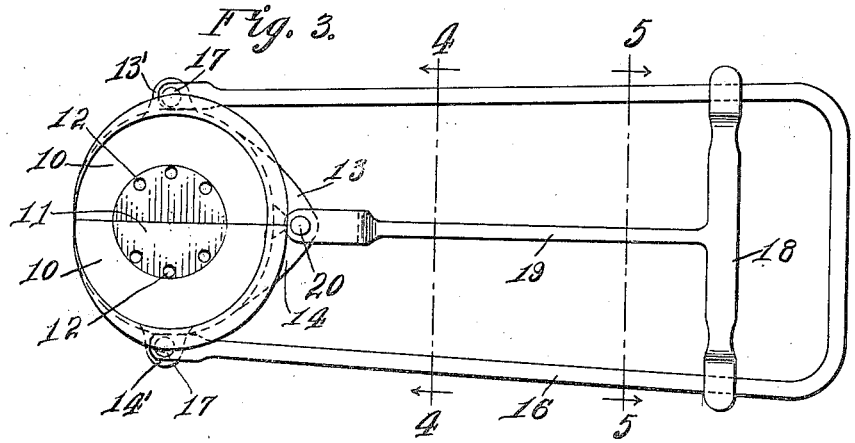
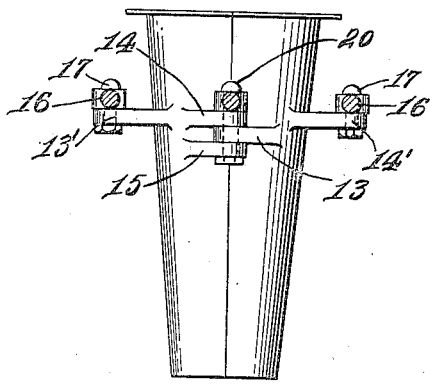
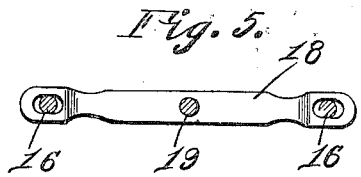
John M. Gibbs
INVENTOR
BY Victor J. Evans
ATTORNEY
WITNESS:

Patented Oct. 3, 1922.

1,430,979

UNITED STATES PATENT OFFICE.

JOHN M. GIBBS, OF PARSONS, KANSAS.

ICE-CREAM DIPPER.

Application filed December 5, 1921. Serial No. 519,994.

*To all whom it may concern:*

Be it known that I, JOHN M. GIBBS, a citizen of the United States, residing at Parsons, in the county of Labette and State of Kansas, have invented new and useful Improvements in Ice-Cream Dippers, and of which the following is a specification.

This invention relates to dispensing devices, particularly to dippers for serving ice cream, and has for its object the provision of a novel dipper for digging or scraping out a certain predetermined quantity of ice cream and forming the same to a certain desired shape, the device being so constructed that it will automatically open when pressure upon the handle thereof is relieved so that the chunk of ice cream will be released from the dipper and be easily deposited upon the plate or saucer upon which it is to be served.

An important and more specific object is the provision of a dipper of this character in which the form proper is formed of sections which are held together while the ice cream is being dipped out and which automatically separates when pressure upon the operating handle is relieved so as to release the chunk or form of ice cream and permit the same to slide out easily onto the service plate.

A further object is the provision of a device of this character in which the form has its smaller end perforated whereby to prevent the compression of air when filling the device and to prevent the formation of a partial vacuum when it is desired to release the chunk of ice.

An additional object is the provision of a device of this character which will be very simple and inexpensive in manufacture, easy to use and keep clean, highly efficient and durable in service and a general improvement in the art.

With the above and other objects and advantages in view, the invention consists in the details of construction to be hereinafter more fully described and claimed, and illustrated in the accompanying drawings in which, Figure 1 is a side elevation of the device.

Figure 2 is a plan view showing the structure in open position.

Figure 3 is a view similar to Figure 2 showing the form in closed position.

Figure 4 is a cross-sectional view taken through the handle looking in one direction.

Figure 5 is a similar view taken through the handle and looking in the other direction.

Referring more particularly to the drawings, I have shown my device as comprising a form which is constructed of a pair of sections 10 each of which is half a truncated cone or each of which might be half of a ball or other shape if preferred. The sections 10 are formed in any desired manner, such as for instance sheet metal or from castings and the material may be white metal or some other suitable equivalent. It is preferable that the sections 10 have their larger ends comparatively thin whereby to define cutting edges which will easily bite or dig into the ice cream to be dispensed and while the smaller ends are comparatively heavy or thicker so as to give the necessary strength. The smaller ends of the sections 10 are closed as indicated at 11 and these closed ends are formed with a plurality of perforations 12 which are for the purpose of permitting the passage of air so that air will not be compressed within the small end of the form and being filled with ice cream and so that a partial vacuum will likewise not be formed when it is desired to remove the ice-cream from the form.

Formed or secured upon one of the sections 10 is a knuckle 13 which is disposed between two knuckles 14 and 15 formed or secured upon the other section. The numeral 16 designates a U-shaped handle which is constructed of resilient material, spring rod of suitable diameter, and this handle has the ends of its arms secured to the outer ends of the knuckles 13 and 14 by means of pivot bolts 17. Slidable upon the handle 16 is a yoke 18 which may likewise be formed of rod bent to shape and carried by this yoke is an extension 19 which has its free end carrying a pivot bolt 20 which passes through the knuckles 13, 14 and 15 and which constitutes the pivot upon which the sections 10 of the form swing.

The operation of the device is as follows: Normally the sections 10 constituting the form are in open position as clearly shown in one of the figures of the drawings, this position being maintained owing to the inherent resilience of the U-shaped handle 16. When the operator desires to use the device for scooping out an order of ice-cream it is necessary that he grasp the handle 16 in such a way that certain of his fingers will engage the yoke 18. He then presses the yoke 18 toward the bight portion of the handle 16 which will result in drawing the pivot point 20 toward the bight portion of the handle and this will naturally cause the sections 10 to swing upon the pivot bolts 17 so that the sections will be in closed position, that is with their free edges in contacting relation. The assembled sections 10 then operate to define a frusto-conical or truncated conical shell which will effectively operate to mould the ice cream to an attractive shape of the desired size. After the mould has been filled with the ice cream it is merely necessary that the operator release his grip upon the yoke 18 whereupon the resilience of the U-shaped handle 16 will cause the sections to swing apart upon the pivot 20 and this will permit the moulded ice cream to slip out onto the saucer or plate upon which it is to be served. Owing to the provision of the perforations 12 in the closed end of the mould it will be apparent that the ice cream will slip out easily and there will be no tendency for the formation of a partial vacuum. Owing to the fact that the entire device is constructed of metal it is apparent that it may be easily scalded or otherwise cleaned in order to keep it in a thoroughly sanitary condition.

From the foregoing description and a study of the drawings it will be apparent that I have thus provided a simply constructed and consequently inexpensive device which is well adapted for use in dishing out ice cream, the device owing to the unusual construction being equally well adapted for scraping out cans as well as digging out chunks of ice cream from comparatively full cans.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. A device of the character described comprising a mould formed of similar sections, knuckles formed on said sections, a pivot bolt pivotally connecting said knuckles, a U-shaped resilient handle connected with the sections at points remote from the knuckles, and a yoke slidable upon a handle and connected with said pivot bolt.

2. A device of the character described comprising a pair of similar sections mating to define a mould, interfitting knuckles carried by said sections, a U-shaped handle of resilient material having the ends of its arms pivotally connected with said sections, a yoke slidable along said handle and formed with an extension pivotally connected with said knuckles at the pivot point thereof.

3. A device of the character described comprising a pair of similar sections mating to define a mould interfitting knuckles carried by said sections, a U-shaped handle of resilient material having the ends of its arms pivotally connected with said sections, a yoke slidable along said handle and formed with an extension pivotally connected with said knuckles at the pivot point thereof, each of said sections being formed at half a truncated cone having its smaller end closed, said closed end being formed with a plurality of perforations.

In testimony whereof I affix my signature.

JOHN M. GIBBS.